United States Patent [19]
Clark

[11] 3,779,828
[45] Dec. 18, 1973

[54] APPARATUS FOR BONDING BEARING LINERS
[75] Inventor: Gordon J. Clark, Bristol, Conn.
[73] Assignee: Textron Inc., Providence, R.I.
[22] Filed: July 8, 1971
[21] Appl. No.: 160,665

Related U.S. Application Data
[62] Division of Ser. No. 873,161, Nov. 3, 1969, Pat. No. 3,668,040.

[52] U.S. Cl. ............... 156/358, 100/93 P, 156/423, 156/581, 156/583, 308/238
[51] Int. Cl. .................................. G05g 15/02
[58] Field of Search ............. 156/358, 423, 581, 156/583; 308/238; 100/93 P

[56] References Cited
UNITED STATES PATENTS
3,184,362  5/1965  Litsky et al. .................. 156/423
3,551,240  6/1967  Damico et al. ............... 156/423 X

*Primary Examiner*—Edward G. Whitby
*Attorney*—Sandoe, Hopgood and Calimafde

[57] ABSTRACT

The invention contemplates maintenance of uniform controlled pressure and temperature at the zone of bonding a fabric or the like liner to a bearing ring or the like, the pressure and temperature being at the levels required for optimum curing of the particular thermosetting material involved. The pressure is developed by axial compression of an elastomeric plug, which is so constrained that radial loading of the lining on the bearing element necessarily results from hydrostatic deformation of the plug. The heat supplied for curing also causes the plug to expand, but the invention provides for automatic compensation for plug expansion so as to maintain substantially constant pressure loading on the liner in the course of a curing cycle. Means are disclosed for the bonding of a plurality of lined bearing elements in a single batch processing cycle.

5 Claims, 8 Drawing Figures

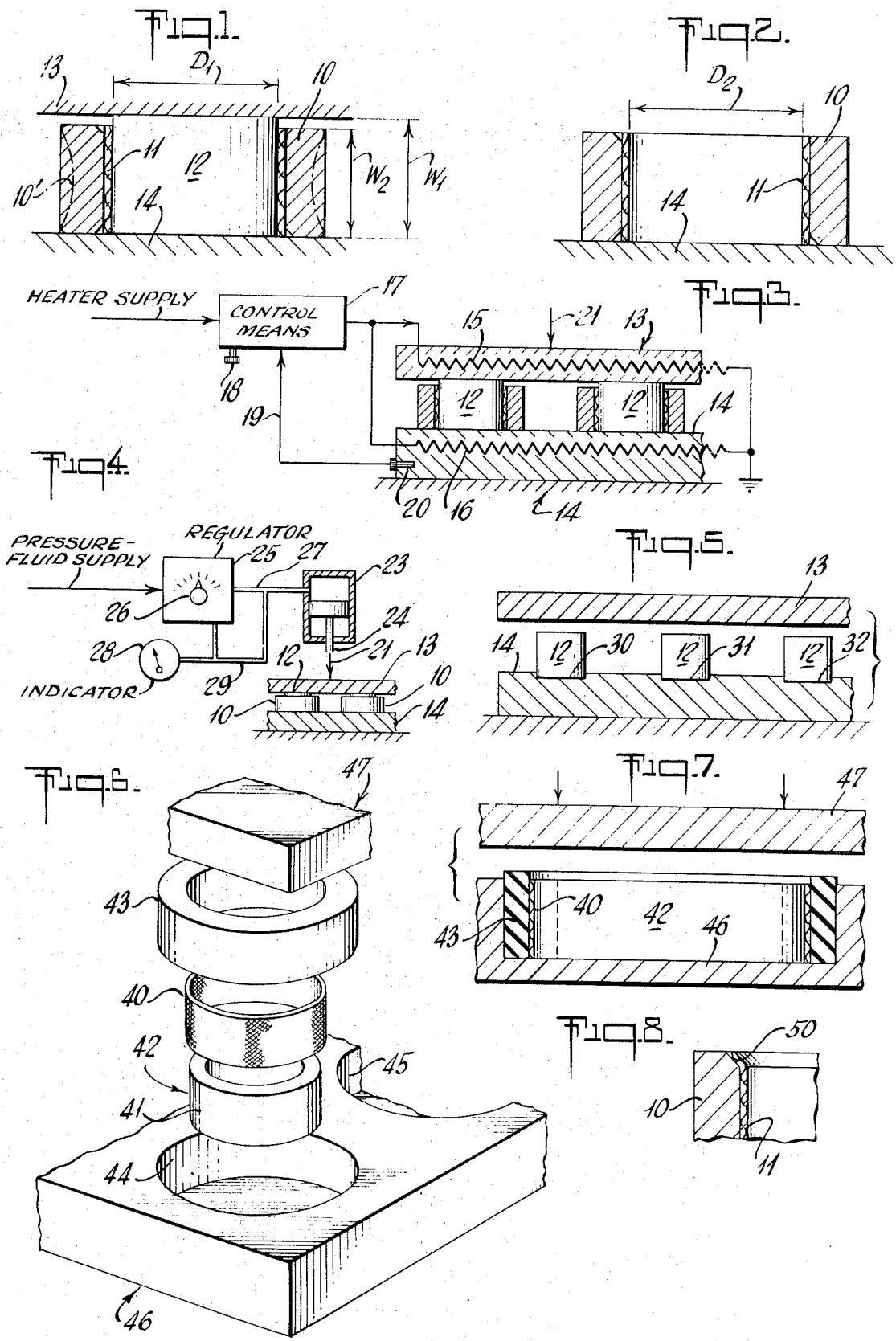

APPARATUS FOR BONDING BEARING LINERS

This application is a division of my copending application, Ser. No. 873,161, filed Nov. 3, 1969, now U.S. Pat. No. 3,668,040.

This invention relates to apparatus and methods for bonding a yieldable liner, such as a low-friction fabric liner, to a rigid supporting surface, such as the cylindrical bore of a bearing element.

In fabric-lined mechanical devices such as so-called plain bearings, wherein bearing efficacy in large part depends on maintenance of the bond between a fabric and a relatively rigid bearing element, there is a problem in achieving bonding uniformity, from one bearing to the next, and as between different localized areas of a given bearing. Such lack of uniformity may result in unsatisfactory bearings and is thus obviously wasteful; and product quality cannot be relied upon if high-performance specifications must be met. Litsky U.S. Pat. No. 3,184,362 discloses a method of applying heat and pressure to cure the bond, utilizing differential thermal expansion coefficients of an aluminum slug in a lined steel ring, but this technique has been found to have limitations, particularly in the circumstance of dimensional variations within tolerance limitations that apply to bore size, fabric bulk, and aluminum slug diameter.

It is, accordingly, an object to provide an improved method and apparatus avoiding or materially reducing the noted difficulties and deficiencies.

A specific object is to provide a method and apparatus for developing bonds of the character indicated, with greater uniformity and of high quality, from one specimen to the next, and throughout the bonded area of any particular specimen.

A further specific object is to provide an improved method and apparatus of the character indicated, particularly adapted to efficient mass-production of bonded articles.

Other objects and various further features of novelty and invention will be pointed out or will occur to those skilled in the art from a reading of the following specification in conjunction with the accompanying drawings. In said drawings, which show, for illustrative purposes only, preferred methods and apparatus of the invention:

FIG. 1 is an enlarged vertical sectional view to illustrate an article in readiness for processing by the method and apparatus of the invention;

FIG. 2 is a view similar to FIG. 1 to show the article after processing according to the invention;

FIG. 3 is a diagrammatic sectional view on a reduced scale to schematically illustrate apparatus of the invention;

FIG. 4 is a similar diagrammatic view to schematically indicate further detail of the apparatus;

FIG. 5 is a vertical sectional view to illustrate modified apparatus;

FIG. 6 is an exploded fragmentary perspective view to illustrate another embodiment of the invention;

FIG. 7 is a view similar to FIG. 1 but directed to the embodiment of FIG. 6; and FIG. 8 is a fragmentary sectional view of a lined bearing element, to illustrate a result achieved by the method and apparatus of the invention.

Briefly stated, the invention contemplates maintenance of uniform controlled pressure and temperature at the zone of bonding a fabric or the like liner to a bearing ring or the like, the pressure and temperature being at the levels required for optimum curing of the particular thermosetting material involved. The pressure is developed by axial compression of an elastomeric plug, which is so constrained that radial loading of the lining on the bearing element necessarily results from hydrostatic deformation of the plug. The heat supplied for curing also causes the plug to expand, but the invention provides for automatic compensation for plug expansion so as to maintain substantially constant pressure loading on the liner in the course of a curing cycle. Means are disclosed for the bonding of a plurality of lined bearing elements in a single batch processing cycle.

FIGS. 1 and 2 show an illustrative article, being a ring 10, respectively before and after processing in accordance with the invention. The ring 10 is a relatively rigid element of a so-called plain bearing, which relies upon a fabric liner 11 to sustain a radial load with respect to a shaft (not shown) slidably positioned by the liner 11. The ring 10 may be a straight cylindrical annulus as shown, in which case the final lined-bore diameter $D_2$ accommodates a suitably matched cylindrical shaft surface. In another employment, the ring 10 may suitably ductile to undergo swaging, as to a concave spherical bore shape, after the liner 11 has been bonded to the cylindrical bore shown; for such a swaging operation, the undeformed ring periphery may be undulated as suggested by phantom outline 10', to provide sufficient end material for producing the deformed ends and at the same time to yield a substantially right-cylindrical outer surface after deformation.

The liner 11 may be one of a variety of weaves, braids, and fiber combinations depending on use requirements. Generally, for self-lubricating low-friction purposes, the fabric of liner 11 preferably provides Teflon (tetrafluoroethylene) fibers at least at the bearing surface. The fabric 11 may be presoaked with uncured (or incompletely cured) thermosetting resin such as a phenolic, and such resin may incorporate adhesive intended ultimately to complete the bond to the ring bore; alternatively, a thermosetting adhesive, such as a phenolic-based adhesive, may be applied as a preliminary coat, either to the ring bore or to the outer surface of fabric liner 11. Alternatively, a thermoplastic adhesive, or a combined thermosetting and thermoplastic adhesive may be used.

In accordance with the invention, an elastomeric plug 12 of diameter $D_1$ (less than the ultimate lined-ring diameter $D_2$) is inserted into axial overlap with the bore of ring 10 and with the uncured fabric liner 11. The undeformed axial extent $W_1$ of the plug 12 exceeds the axial extent $W_2$ of the liner 11, the latter extent being also the width of the bearing ring 10. The thus preliminarily assembled parts are placed between upper and lower platens 13–14, which will be understood to form part of a press for axially compressing the plug 12, thereby achieving radially outward uniform compression of the liner 11 over the surface of the ring bore. Such pressure, and heat, are maintained for the curing interval, at the conclusion of which the platens are separated to allow plug restoration to the unstressed state, whereupon the bonded article (lined ring 10–11) is removed from the plug and from the press.

FIG. 3 schematically illustrates heating means 15–16 carried by the respective platens 13–14, and the platens 13-14 are sufficiently extensive to embrace a spaced plurality of preliminarily assembled rings liners and plugs 12. The heating means 15-16 is shown to be electrical, governed by a single control means 17, with provision at 18 for manual selection of a desired controlled-heat level, as monitored by a feedback connection 19 which includes a heat-sensitive element 20 carried by one of the platens. The heavy arrow 21 suggests means to downwardly displace the upper platen 13, for developing the indicated compression of all plugs 12 in the batch which is being processed.

FIG. 4 supplies further detail as to an illustrative means for downwardly displacing the upper platen 13 and for providing controlled pressure loading of the liners in the respective ring bores, throughout the bonding (curing) interval. The platen-displacement mechanism is shown to include a hydraulic cylinder 23 with a piston-rod connection 24 to the upper platen 13. Pressure fluid from a suitable source is supplied to the head end of cylinder 23 via a regulator 25 having manual means 26 for selection of a desired delivery pressure to be maintained in the outlet line 27 to cylinder 23. If desired, an indicator 28 may track the delivered pressure, by connection to the feedback line 29 which governs regulator action. The platen-positioning mechanism will be understood to include further means (not shown) for retracting platen 13 to relieve plug compression and to permit finished-part removal.

In use, the material of plug 12 is selected from the various high-temperature elastomers which have thermal capability to meet current adhesive bonding requirements. I have found it satisfactory to employ a fluorinated elastomer by the name VITON-A, being a product of E.I. duPont de Nemours and Co.; such an elastomer is eminently satisfactory for temperatures in the order of 375°F., as used in the curing of phenolics. On the other hand, should the thermoset material be a polyimide, in which case bonding temperatures are in the order of 550°F., I have found it satisfactory to employ a silicone rubber by the name Silastic, being a product of Dow Chemical Co.

Generally, the undeformed plug diameter may match the preliminarily assembled liner and ring, with a clearance in the order of one mil, and the amount by which the axial extent of plug 12 exceeds the axial extent of the liner 11 may be in the order of a few thousandths of an inch.

Platen pressure applied by means 23-25 radially compresses the liner 11 to the ring bore, at a level selected at 26. The heated platens cause plug 12 to expand against the regulated pressure loading at 23, so that even if this expansion involves upward displacement of platen 13, the radial load on the liner remains substantially constant throughout the curing cycle.

FIG. 5 illustrates a slight modification wherein spaced like bored recesses 30-31-32 in the lower platen 14 serve to locate the plugs 12 used in batch curing of bonded liners. In certain cases, it may be convenient to assemble plugs 12 first to the recesses 30-31-32, and then to assemble liners and rings to the plugs 12. In other situations, it may be more convenient to preassemble the plugs 12 with their liners and rings, prior to mounting the preassemblies at the locating recesses 30-31-32. In either event, uniform spacing of bonding regions is readily achieved with the arrangement of FIG. 5.

FIGS. 6 and 7 illustrate use of the invention in the bonding of a fabric strip or liner 40 to the outer cylindrical surface 41 of a bearing element or ring 42. In this situation, the adhesive is inside the fabric and the elastomeric plug 43 is annular and is outside the fabric. Axial compression of plug 43 is translated into radial compression of the liner 40 to cylindrical surface 41 by circumferentially constraining the plug 43. In the form shown, spaced bores 44-45 in the upper face of the lower platen 46 accommodate the plugs 43, as with a 1-mil clearance for easy insertion; and, as with the previously described embodiment, the axial extent of the plug (43) exceeds the axial extent of the liner 40. Stated in other words, the plug 43 projects sufficiently, or the platens 46-47 are otherwise suitably configurated, to permit the desired plug compression prior to platen interference with each other or with ring 42.

It will be seen that the invention provides greater flexibility in application of bonding pressure during the curing cycle. Bond strength between the fabric and the cylindrical surface to which it is bonded is difficult to evaluate; however, tests indicate bond integrity at least as good if not better than that obtainable with aluminum plugs under the best conditions. This result is achieved with plugs for which dimensioning is not critical, as in the case of the diameter of an aluminum plug. Moreover, unlike the aluminum plug, the elastomeric plug lends itself to uniformly distributed application of radial pressure and to ready conformation of the liner to a chamfer or other edge configuration of the cylindrical surface to be lined; such a conformed lining appears at 50 in the case of a lined chamfered bore, in FIG. 8.

The method of the invention achieves the foregoing advantages while also simplifying the heating process, by eliminating the need for oven curing, since heated platens do not require an oven. Moreover, large batches may be cured under like, regulated, conditions of elevated heat and pressure, in spite of plug expansion due to heat.

Although the invention has been described in detail for the methods and apparatus shown, it will be understood that modifications may be made without departing from the invention.

What is claimed is:

1. Apparatus for curing the thermoset bond of a fabric liner in circumferential adjacency to a continuous cylindrical surface of a cylindrical bearing element, comprising a pair of platens in opposed spaced relation, one of said platens being adapted to support an axial end of said cylindrical bearing element with the bearing-element axis substantially normal to said one platen, a plug of elastomeric material supported at one end on said one platen, said plug having a cylindrical surface adjacent to and in full axial overlap with the fabric-liner-bearing surface of said bearing-element, the other end of said plug projecting beyond the other end of said bearing element, means for advancing said platens toward each other and for adjustably axially loading the squeeze effort of said platens on said plug, means for heating said platens and for maintaining a predetermined heated state of the bearing element and plug between said platens, and means responsive to achievement of a predetermined axial-loading effort on the squeezed plug and in controlling relation with said adjustable loading means for maintaining a predetermined axial-squeeze loading on the plug in spite of plug-expansion due to heat, the extent of such projection being at least sufficient to enable a predetermined pressure-loading of the compressed plug on the liner and bearing element while free of bearing-element interference with platen movement.

2. Apparatus according to claim 1, in which said bearing element is an annular ring, and in which said plug is cylindrical and is of diametral extent to fit the bore of said ring with the fabric liner and thermoset material between the ring and plug.

3. Apparatus according to claim 1, in which said cylindrical surface is convex, and in which said one platen includes rigid circumferentially continuously extending means limiting said plug against radial expansion, the bore of said plug being of diametral extent to fit over said cylindrical bearing-element surface with the fabric liner and thermoset material between the bearing element and plug.

4. The apparatus of claim 1, in which said loading means is hydraulic and includes means for indicating the loading pressure thereof.

5. The apparatus of claim 4, in which said loading means includes a pressure regulator and selectively operable means for adjusting the same.

* * * * *